Aug. 10, 1937. H. WYDLER 2,089,724
APPARATUS FOR DISPENSING MEASURED QUANTITIES OF LIQUID
Filed Aug. 19, 1936
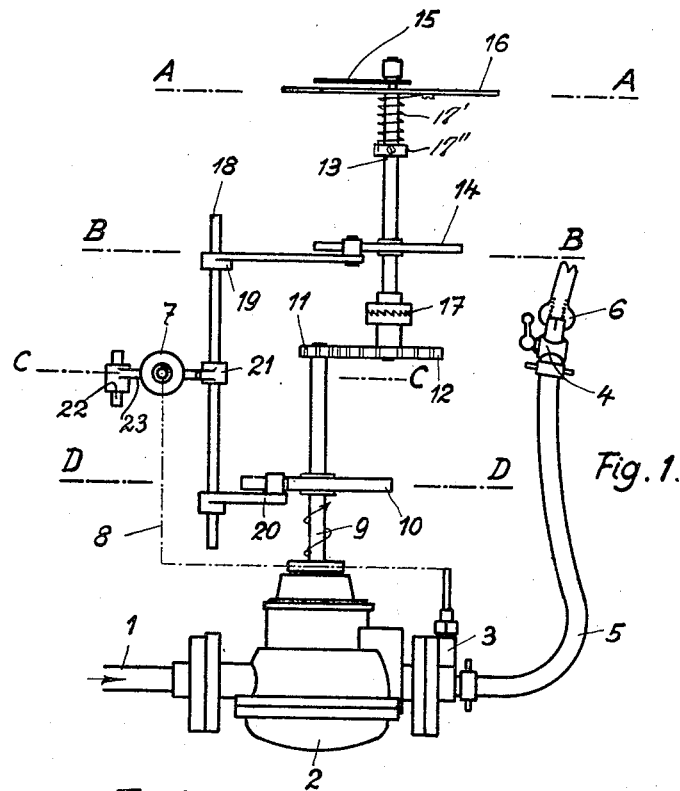
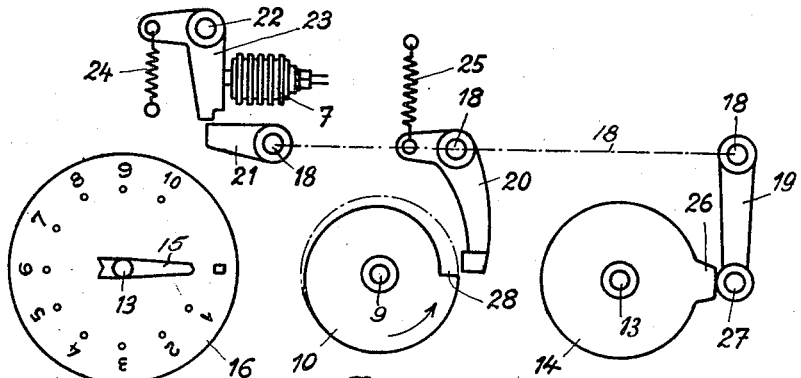
Inventor: H. Wydler
By: Glascock Downing & Seebold
Attys.

Patented Aug. 10, 1937

2,089,724

UNITED STATES PATENT OFFICE 2,089,724

APPARATUS FOR DISPENSING MEASURED QUANTITIES OF LIQUID

Hermann Wydler, Bern, Switzerland, assignor to the firm Sauser A.-G., Soleure, Switzerland, a joint-stock company of Switzerland Application August 19, 1936, Serial No. 96,908
In Switzerland August 19, 1935

1 Claim. (Cl. 221—101)

The present invention relates to a liquid measuring and tapping device.

Measuring and tapping devices for liquids are known already having totalizing counters in which the liquid under pressure may be dispensed by means of a cock located before the counter. Such counters show normally a graduation on which the retailed quantity of liquid may be read off. Now it is somewhat difficult for the retailer to let out exactly the desired quantity. He must constantly watch the graduation or the counter for closing the cock at the right moment. Trippings are therefore always possible and therefore also such devices have not given all satisfaction.

The present invention is a liquid measuring and tapping device having also a counter, but it has also means to stop the counter and the tapping at the end of the last measuring unit provided that previously to the stopping a choking of the outlet be effected, further means being provided to prevent a stopping at the zero position of the counter. With this arrangement it is possible to adjust the device by choking the outlet in such a manner that after such choking only a determined quantity of liquid will be measured and the counter be stopped automatically but all this only after the device has delivered at least one unit. A locking of the apparatus can only be effected if the index of the counter be not in the zero position.

The annexed drawing shows a diagrammatical arrangement of the invention.

Fig. 1 is a general view,

Fig. 2 a view of a dial on line A—A in Fig. 1,

Fig. 3 a view of a cam disk on line B—B in Fig. 1,

Fig. 4 a view of a releasing pawl on line C—C in Fig. 1, and

Fig. 5 a view of a blocking disk on line D—D in Fig. 1.

In Fig. 1 the inlet conduit of the liquid is designated with 1, the volumetric counter with 2, and the outlet neck with 3. A hose 5 carrying a choking or cut-off cock 4 is attached to the neck 3 and the cock 4 is combined with a spring controlled nonreturn valve 6. The whole device up to the nonreturn valve is filled with liquid. The outlet neck 3 communicates with the corrugated tube 7 by means of a conduit 8. Therefore when the delivery of liquid is choked or closed there will be created an increase of pressure in the whole system, which will expand the corrugated pipe and operate the lever 23. The shaft 9 of the counter turning in the direction of the arrow will turn the gear wheels 11 and 12 and the shaft 13 of the index. A blocking disk 10 is fastened to the shaft 9 and shaft 13 of the index carries rigidly fast thereto a cam disk 14 provided with a cam 26 and the index 15, which latter shows on the stationary dial 16 the delivered quantity of liquid in units. A spring controlled unidirectional coupling 17 permits the restoration of the zero position of the index 15. The spring 17' controlling said coupling is sleeved over shaft 13 and fast to the stationary dial 16 and bears on a collar 17'' fast to shaft 13 to maintain the teeth of the coupling members in mutual engagement. This arrangement permits the resetting by hand of the index hand 15 into its zero position by a pull in an axial sense of shaft 13 to disengage first the teeth of the coupling member. The lever shaft 18 carries fast thereto the levers 19, 21 and pawl 20. An angular lever 23 fast to a shaft 22 and controlled by a spring 24 is in operative contact with the corrugated tube 7. A spring 25 tends to press the lever 19 against the disk 14 and pawl 20 against disk 10 and arm 21 into a recess at the end of arm 23.

For starting the device the following conditions must be filled:

The meter 2 must be of the displacement type where no flow can take place unless the meter is registering, also the whole system must be filled with liquid up to the nonreturn valve and finally in the zero position the parts must have assumed the position shown in Figs. 2 to 5.

When the liquid pump is started, pressure is raised in the system and shaft 9 of the meter will begin to rotate and dispense liquid through the nonreturn valve 6 when cock 4 is opened. Since shaft 13 is also rotated, also the index 15 will travel on the dial marking the dispensed units of liquid. By the rotating of shaft 13 cam 26 will leave its contact with the roller 27, but shaft 18 with lever 19 and pawl 20 in an upraised position will remain in its position contrary to the pull of spring 25 because arm 21 will be kept in contact with lever 22. Thus the shafts 9 and 13 may complete any number of consecutive revolutions in spite of the recess 28 until index 15 approaches the numeral of the dial marking the desired number of units to be dispensed. Before this numeral is reached, the attendant of the apparatus operates the cock 4 by choking for a moment the flow of liquid. By this movement a sudden rise of pressure will be created in the system and communicated to the bellows device or corrugated tube 7. This will expand and relieve arm 21 which will come into contact with a recessed part at the end of lever arm 23 but this movement swings pawl 20 in a clockwise direction to bear on the surface of disk 10 until it meets recess 28 and stops shaft 9 and the meter. The dispensing of liquid is therefore interrupted exactly at the end of the last measuring unit, since each revolution of disk 10 corresponds to one unit. By the stopping of the meter also the pressure in the hose 5 will be relieved and the nonreturn valve closed by its spring at once, so that said hose remains still filled with liquid. As regards cam 26 this cam may happen to be left in a position remote from its initial position in which it makes contact with roller 27. But to restore this starting position as represented in Fig. 3 the index 15 needs only to be brought back by hand into its zero position, whereupon lever 19 being raised again, will also swing arm 21 back into its initial position shown in Fig. 4. The starting position of parts having been restored, a new dispensing of liquid may be operated.

As a matter of course the meter can only operate when cock 4 is open. After the restoration of the zero position of parts cock 4 will also be closed and prevent thereby a premature operating of the meter.

What I claim is:

In an apparatus for dispensing measured quantities of liquid and in combination with a pressure operated flow meter of the displacement type connected with an admission conduit of the liquid under pressure and a delivery hose attached to the meter, a cock and a nonreturn valve joined thereto, both forming the shut-off of the hose filled with liquid, means adapted to prevent the stopping of the delivery at the zero position of the meter, said means comprising, a portion of the meter shaft projecting from the meter and a recessed cam disk fast thereto, an index shaft having an index secured to one end thereof, and a cam disk fast to a median portion of this shaft and provided with a cam registering with the index arm, a transmission gear between the other end of said index shaft and the meter shaft and arranged to impart one revolution per measured unit to the index shaft, a spring controlled unidirectional coupling on this index shaft next to said gear and a stationary dial combined with the index, an auxiliary shaft parallel to the meter shaft, and fast to this shaft; a spring controlled pawl to cooperate with said recessed cam disk, a lever arm controlled by the cam on the index shaft and a further arm to control this shaft, a spring controlled angular lever to cooperate with this control arm and block the auxiliary shaft, and a corrugated expanding tube in cooperative contact with said angular lever and depending on the increase of pressure in the delivery hose.

HERMANN WYDLER.